United States Patent
Kelley et al.

(10) Patent No.: US 6,327,598 B1
(45) Date of Patent: Dec. 4, 2001

(54) REMOVING A FILLED-OUT FORM FROM A NON-INTERACTIVE WEB BROWSER CACHE TO AN INTERACTIVE WEB BROWSER CACHE

(75) Inventors: Edward E. Kelley, Wappingers Falls; Norman J. Dauerer; John U. Knickerbocker, both of Hopewell Junction, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/977,184

(22) Filed: Nov. 24, 1997

(51) Int. Cl.[7] .................................................. G06F 15/00

(52) U.S. Cl. ..................... 707/513; 707/501.1; 707/505; 707/506; 707/507; 707/508

(58) Field of Search .................................... 707/505, 506, 707/507, 508, 501, 513; 709/229

(56) References Cited

U.S. PATENT DOCUMENTS

| | | | |
|---|---|---|---|
| 4,763,356 | 8/1988 | Day, Jr. et al. ....................... | 379/368 |
| 5,410,697 | * 4/1995 | Baird et al. ........................... | 711/152 |
| 5,530,759 | 6/1996 | Braudaway et al. .................... | 380/54 |
| 5,640,577 | * 6/1997 | Scharmer .............................. | 707/507 |
| 5,647,056 | 7/1997 | Barrett et al. ......................... | 709/220 |

(List continued on next page.)

OTHER PUBLICATIONS

A Domain Model of WWW Browsers, Raghavan et al, Southeastcon '96 IEEE, 1996, p. 436–439.*
Iyengar,A., IEEE Computing, vol. 1, ISS.2, Mar.–Apr. 1997, p.50–56.*
Microsoft Internet Explorer 3 Unleashed, Fincher, G., Mcmill. Comp. Pub., pg. 1, 14–17, Sep. 20, 1996.*
Netscape Comnctr. 6–in–1, Guildford, E. Mcmill. Comp. Pub., pg. 23–28, 43–46, 97–99, 207–211, Jul. 11, 1997.*
Canon Internet Web Page, www.ccsi.canon.com/webrecord/, Aprl. 24, 1997.
IBM Technical Disclosure Bulletin, "Temporary Global Passwords", vol. 36, No. 03, Mar. 1993; pp. 451–453.
IBM Technical Disclosure Bulletin, "Resource Access Control Facility Password Propogation for Multiple Virtual Storage", vol. 36, No. 06B, Jun. 1993.
IBM Technical Disclosure Bulletin, "Network Signon Coordination Configuration", vol. 36, No. 12, Dec. 1993.

*Primary Examiner*—Stephen S. Hong
*Assistant Examiner*—Cesar B. Paula
(74) *Attorney, Agent, or Firm*—DeLio & Peterson, LLC; Kelly M. Reynolds (57) ABSTRACT

A process and system for controlling and moving along a path containing previously accessed interactive inter- or intra-net HTML source files and bypassing certain interactive HTML source files which contain informational messages. A web browser is provided having i) a first non-interactive web browser cache for storing data from a plurality of HTML source files and a first non-interactive web browser screen access path for identifying and displaying each of the HTML source files in the first cache, and ii) a second interactive web browser cache for storing data from a plurality of HTML source files and a second interactive web browser screen access path for identifying and displaying each of the HTML source files in the second cache. A desired non-interactive HTML source file is selected, downloaded to the web browser, and stored in the non-interactive web browser cache and the non-interactive web browser screen access path. A desired interactive HTML source file for a form which presents blank spaces for entry of information at the web browser is then selected, downloaded, and stored in the non-interactive web browser cache and the non-interactive web browser screen access path. Finally, blank spaces on the desired interactive HTML source file form are filled-in; and the desired interactive HTML source file form presenting filled-in spaces is stored in the interactive web browser cache and the interactive web browser screen access path.

21 Claims, 4 Drawing Sheets

U.S. PATENT DOCUMENTS

| | | | | |
|---|---|---|---|---|
| 5,666,502 | * | 9/1997 | Capps | 345/352 |
| 5,715,450 | * | 2/1998 | Ambrose et al. | 707/103 |
| 5,794,259 | * | 8/1998 | Kikinis | 707/507 |
| 5,862,325 | * | 1/1999 | Reed et al. | 709/201 |
| 5,864,852 | * | 1/1999 | Luotonen | 713/201 |
| 5,873,100 | * | 2/1999 | Adams et al. | 707/204 |
| 5,894,554 | * | 4/1999 | Lowery et al. | 709/203 |
| 5,930,799 | * | 7/1999 | Tamano et al. | 707/102 |
| 5,946,697 | * | 3/1999 | Shen | 707/104 |
| 5,948,066 | * | 9/1999 | Whalen et al. | 709/229 |
| 5,961,602 | * | 10/1999 | Thompson et al. | 709/229 |
| 5,968,119 | * | 10/1999 | Stedman et al. | 709/229 |

* cited by examiner

REMOVING A FILLED-OUT FORM FROM A NON-INTERACTIVE WEB BROWSER CACHE TO AN INTERACTIVE WEB BROWSER CACHE

BACKGROUND OF THE INVENTION

1. Field of the Invention

The present invention relates to computer programs and in particular to software for controlling and moving along paths of previously accessed interactive inter- or intra-net HTML source files.

2. Description of Related Art

Current web browsers for accessing HTML (HyperText Markup Language) files from inter- or intra-net computer servers build an access path for accessed web pages constructed from data in the HTML files and provide the ability to move backward and forward along the access path. While this works well for data (non-interactive) web pages, it has drawbacks for interactive web pages. An interactive web page includes response areas on the screen that are used to communicate information to the user.

Although from the perspective of the user on the client computer it may appear as though only one interactive screen is used, in reality a new screen is created from the HTML data each time there is communication between the user and the web server program on the network computer. In most instances, the user is not interested in the various iterations of the same screen with blanks partially or wholly filled in.

These various screens which differ little from each other create a problem when the user attempts to move backward along the access path. The user must navigate through every screen that was created in the course of filling in the blanks for the interactive session to get back original screen position. When using the "BACK" function on the typical web browser, this means that additional time is expended. Additionally, the web browser cache in which the data to reconstruct the screens using HTML has its limits, which means that fewer different screens are saved. If the web browser screen access path is utilized, this path record may also be limited in the number of screen and web site URLs (Uniform Resource Locators) stored.

Bearing in mind the problems and deficiencies of the prior art, it is therefore an object of the present invention to provide an improved method and system for controlling and moving along paths of previously accessed interactive inter- or intra-net HTML source files.

It is another object of the present invention to provide a web browser which will have the ability in the web browser cache and web browser screen access path to distinguish between interactive screens having blanks and interactive screens having filled-in blanks.

It is a further object of the present invention to provide a web browser which will have the ability to selectively eliminate from the web browser cache interactive screens having filled-in blanks.

It is yet another object of the present invention to provide a web browser which will have the ability to avoid in the web browser screen access path interactive screens having filled-in blanks.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for controlling and moving along a path containing previously accessed interactive inter- or intra-net HTML source files and bypassing certain interactive HTML source files which contain informational messages. First, there is provided a web browser having i) a first non-interactive web browser cache for storing data from a plurality of HTML source files and a first non-interactive web browser screen access path for identifying and displaying each of the HTML source files in the first cache, and ii) a second interactive web browser cache for storing data from a plurality of HTML source files and a second interactive web browser screen access path for identifying and displaying each of the HTML source files in the second cache. The process includes selecting a desired non-interactive HTML source file, downloading the desired non-interactive HTML source file to the web browser, and storing the desired non-interactive HTML source file in the non-interactive web browser cache and the non-interactive web browser screen access path. Next, the process includes selecting a desired interactive HTML source file for a form which presents blank spaces for entry of information at the web browser, downloading the desired interactive HTML source file to the web browser, and storing the desired interactive HTML source file for a form which presents blank spaces in the non-interactive web browser cache and the non-interactive web browser screen access path. Finally, the process includes filling in the blank spaces on the desired interactive HTML source file form; and storing the desired interactive HTML source file form presenting filled-in spaces in the interactive web browser cache and the interactive web browser screen access path.

The process may further include traversing the non-interactive web browser screen access path and optionally displaying an HTML source file from data in the non-interactive web browser cache, such that only the non-interactive HTML files and the interactive HTML source file for a form which presents blank spaces are displayed.

Also, the process may include traversing the non-interactive web browser screen access path and printing a web page from data in the non-interactive web browser cache.

The process may also include traversing the interactive web browser screen access path and optionally displaying an HTML source file from data in the interactive web browser cache, such that only the interactive HTML files for forms which present filled-in spaces are displayed. Further, the process may include traversing the interactive web browser screen access path and printing a web page from data in the interactive web browser cache.

Preferably, a plurality of interactive HTML source file forms presenting filled-in spaces are stored in the interactive web browser cache and the interactive web browser screen access path, and the process further includes eliminating from the interactive web browser screen access path an interactive HTML source file form presenting filled-in spaces if the only difference between such interactive HTML source file form presenting filled-in spaces and another interactive HTML source file form presenting filled-in spaces is an informational message.

In another aspect, the present invention provides a web browser system for controlling and moving along a path containing previously accessed interactive inter- or intra-net HTML source files and bypassing certain interactive HTML source files which contain informational messages. The system comprises a first non-interactive web browser cache adapted to store data from a plurality of non-interactive HTML source files and a plurality of interactive HTML source files for forms which present blank spaces for entry of information at the web browser and a first non-interactive web browser screen access path for identifying and displaying each of the non-interactive HTML source files and interactive HTML source files for forms which present blank spaces from data in the first web browser cache. The system also comprises a second interactive web browser cache for storing data from a plurality of interactive HTML source files for forms which present filled-in spaces, and a second interactive web browser screen access path for identifying and displaying each of the interactive HTML source files for forms which present filled-in spaces from data in the second web browser cache.

The system may further include means for displaying from data in the first web browser cache only the non-interactive HTML source files and interactive HTML source files for forms which present blank spaces and means for displaying from data in the second web browser cache only the interactive HTML source files for forms which present filled-in spaces. Also, the system may further comprise means for printing from the first web browser cache only the non-interactive HTML source files and interactive HTML source files for forms which present blank spaces and means for printing from the second web browser cache only the interactive HTML source files for forms which present filled-in spaces.

In a further aspect, the present invention provides a program storage device readable by a machine, which tangibly embodies a web browser having i) a first non-interactive web browser cache for storing data from a plurality of HTML source files and a first non-interactive web browser screen access path for identifying and displaying each of the HTML source files in the first cache, and ii) a second interactive web browser cache for storing data from a plurality of HTML source files and a second interactive web browser screen access path for identifying and displaying each of the HTML source files in the second cache. The web browser further has a program of instructions executable by the machine to perform a process for controlling and moving along a path containing previously accessed interactive inter- or intra-net HTML source files in accordance with the processes described above.

In yet another aspect, the present invention provides a process for controlling and moving along a path containing previously accessed interactive inter- or intra-net HTML source files. There is first provided a web browser having a web browser cache for storing data from a plurality of HTML source files and a web browser screen access path for identifying and displaying each of the HTML source files. The web browser is present on a client computer which has access to HTML source files on a network computer. The process includes downloading a desired HTML source file from the network computer to the web browser on the client computer, and determining if the desired HTML file is an interactive or non-interactive HTML file. The desired HTML file is stored in the web browser cache and the web browser screen access path only if the HTML file is a non-interactive HTML file or if the HTML file is an interactive HTML file for a form which presents blank spaces for entry of information at the web browser. The process finally includes traversing the web browser screen access path and optionally displaying an HTML source file from data in the web browser cache such that only non-interactive HTML files and interactive HTML files for forms which present blank spaces are traversed and, optionally, displayed.

The process may further include traversing the web browser screen access path and printing a web page from data in the web browser cache. A plurality of interactive HTML source files for forms which present filled-in spaces may be stored in the interactive web browser cache and the interactive web browser screen access path, and the process may further include eliminating from the interactive web browser screen access path an interactive HTML source file for a form which presents filled-in spaces if the only difference between such interactive HTML source file form which presents filled-in spaces and another interactive HTML source file for a form which presents filled-in spaces is an informational message.

In another aspect, the present invention provides a web browser system for controlling and moving along a path containing previously accessed interactive inter- or intra-net HTML source files. The system includes a web browser cache adapted to store data from a plurality of non-interactive HTML source files and a plurality of interactive HTML source files for forms which present blank spaces for entry of information at the web browser. The web browser is further adapted to eliminate from the web browser cache interactive HTML source files for forms which present filled-in spaces. Also included is a web browser screen access path for identifying and displaying only the non-interactive HTML source files and interactive HTML source files for forms which present blank spaces from data in the web browser cache.

Such a system may further comprise means for displaying from data in the web browser cache only the non-interactive HTML source files and interactive HTML source files for forms which present blank spaces, and means for printing from the web browser cache only the non-interactive HTML source files and interactive HTML source files for forms which present blank spaces.

In yet a further aspect, the present invention provides a program storage device readable by a machine, which tangibly embodies a web browser having i) a web browser cache adapted to store data from a plurality of non-interactive HTML source files and a plurality of interactive HTML source files for forms which present blank spaces for entry of information at the web browser, the web browser further adapted to eliminate from the web browser cache interactive HTML source files for forms which present filled-in spaces; and ii) a web browser screen access path for identifying and displaying only the non-interactive HTML source files and interactive HTML source files for forms which present blank spaces from data in the web browser cache. The web browser further has a program of instructions executable by the machine to perform a process as described above for controlling and moving along a path containing previously accessed interactive inter- or intra-net HTML source files.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(s)

In describing the preferred embodiment of the present invention, reference will be made herein to FIGS. 1–4 of the drawings in which like numerals refer to like features of the invention. Features of the invention are not necessarily shown to scale in the drawings.

In describing the method and system of the present invention, it will be useful to describe a client computer which uses a web browser to download desired web pages from a network server and the manner in which typical non-interactive and interactive web pages are stored and displayed on the client computer accessing such web pages from the network server.

Figure 1:
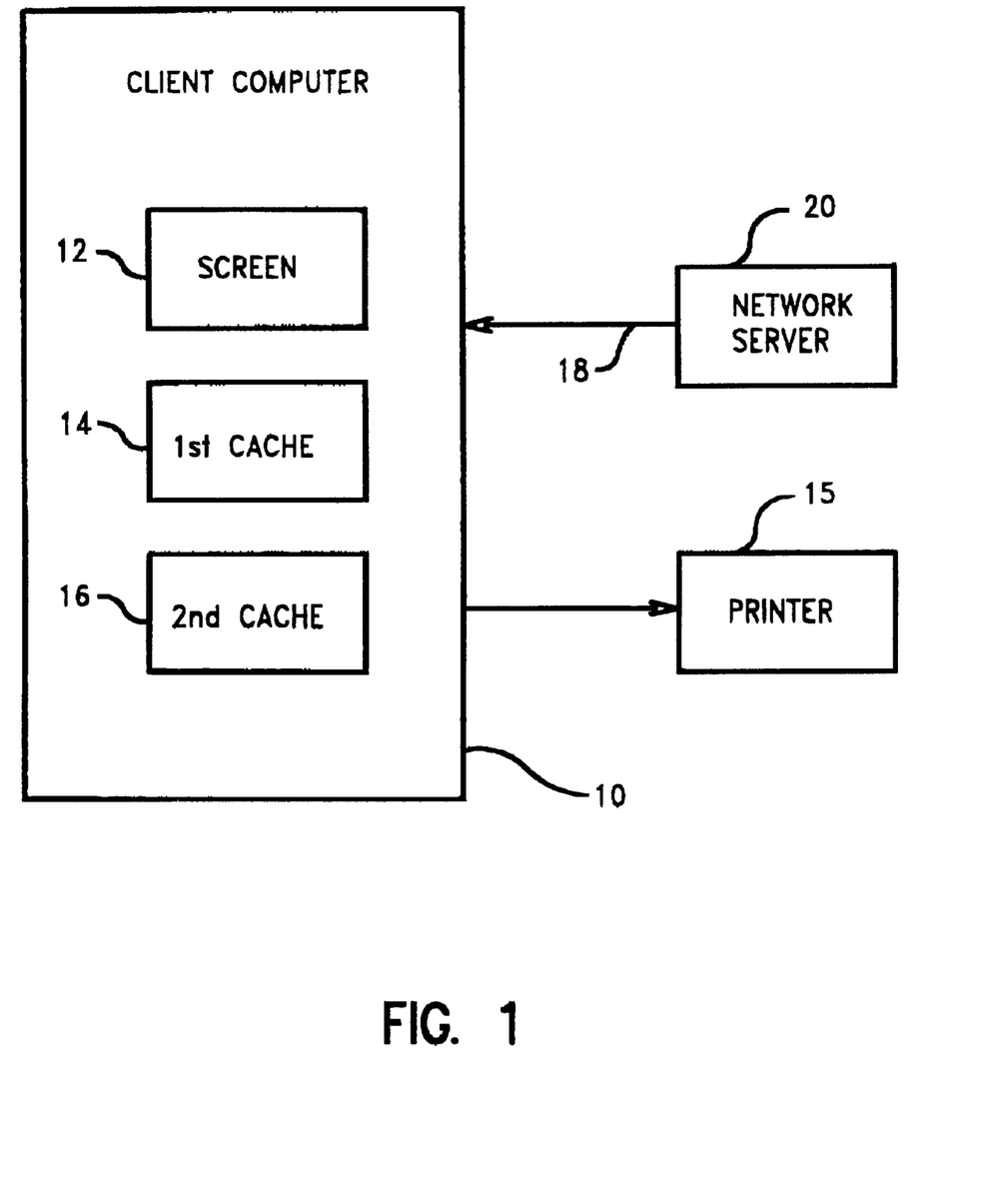
FIG. 1 is a schematic of the system of the present invention for controlling and moving along paths of previously accessed interactive inter- or intra-net HTML source files.

A typical client/network system is illustrated in FIG. 1. Client computer 10 is linked by telephone or other network cable 18 to a server computer or other database 20. Such server or database may be on the Internet or on an intranet system. Client computer 10 has a microprocessor for executing stored programs and includes first and second caches 14, 16, respectively, on its program storage device for storage data to construct HTML web pages, downloaded from a network service provider. The computer program or software incorporating the process steps and instructions described further below may be stored on an otherwise conventional program storage device, such as a semiconductor chip, a read-only memory, or magnetic media such as a diskette or computer hard drive, which is readable and executable by a computer in conjunction with a web browser such as Netscape Navigator. A screen 12 is able to display the desired web pages (such as those shown in the tables below) accessed from one or the other of the web browser caches through the web browser screen access path associated with each. Printer 15 is connected to the client computer for printing out the desired web pages discussed in more detail below.

The first cache 14 is used for saving screens which are non-interactive. Non-interactive screens include those which do not contain blanks for information to be filled in, as well as screen which appear with blanks, before they are filled in. Screens created with blanks filled-in, i.e., with data added, are considered interactive and saved in the second cache 16. The program storage device of the client computer also stores a web browser screen access path for each of the first and second caches.

Definitions relevant to the present invention are as follows:

Form: The form element encompasses the content of an HTML fill-in form. This is the element that is used to create fill-in forms with check boxes, radio boxes, text, and buttons. Data from the FORM must be sent to the web server for the gateway program to process. The Form collects data, but does not process it.

Web browser cache: A storage area where the files that the web browser uses to store data for the screens that were previously built. This storage area is used to quickly recreate screens without having to go back to the server.

Screen access path: A path that is built that allows the web browser to quickly build and display previous screens in the order and reverse order that they were created.

Interactive screen access path: A path that is built to that allows the web browser to quickly build and display previous interactive screens in the order and reverse order that they were created.

Interactive web browser cache: A storage area where the files that the web browser uses to store data for the interactive screens that were previously built. This storage area is used to quickly recreate screens without having to do back to the server.

Gateway programs: Used when a client on the web sends information to the web server for processing that is not done by the server but is handed off to a program for processing.

HTML: HyperText Markup Language.

HTML source file: File with the HTML tags to be converted by a web browser to be displayed on a monitor.

HTML file: File that has been formatted by the web browser and will be displayed on a monitor.

SCREEN: Portion of the HTML file that the viewer sees when a web browser displays the HTML file on the monitor.

URL: A text string that indicated the server protocol to use in accessing the resource, the internet domain name of the server, and the name and location of the resource on that particular server.

Interactive screen: A screen that a user enters data into and receives responses from the web server. Interactive screens are followed by informational messages from the server that require further action by the client computer, e.g., correction of an error. Non-interactive screens require no further action by the client computer.

The series of tables below provide examples of the display of non-interactive and interactive screens.

Table 1 below shows the display of information on an initial screen that requires the user to input data to have a password changed:

TABLE 1

INITIAL SCREEN

ILC Change AFS Password

Select fishkill.ibm.com for ILC. Note: the DEFAULT is fishkill

| | |
|---|---|
| fishkill.ibm.com | ___ |
| clt.ibm.com | ___ |
| end.ibm.com | ___ |
| btv.ibm.com | ___ |
| sax.btv.ibm.com | ___ |
| tkl.ibm.cotn | ___ |

Enter your user-id: ___
Enter your password: ___
Enter your new password: ___
Re-enter your new password: ___

Message_____________

Table 2 below shows the display of information on the screen of Table 1 with the data filed in:

TABLE 2

FILLED-IN DATA

ILC Change AFS Password

Select fishkill.ibm.com for ILC. Note: the DEFAULT is fishkill

| | |
|---|---|
| fishkill.ibm.com | _x |
| clt.ibm.com | ___ |
| end.ibm.com | ___ |
| btv.ibm.com | ___ |
| sax.btv.ibm.com | ___ |
| tkl.ibm.com | ___ |

Enter your user-id: EdKelley

TABLE 2-continued

FILLED-IN DATA

Enter your password: \*\*\*\*\*\*
Enter your new password: \*\*\*\*\*\*
Re-enter your new password: \*\*\*\*\*\*
Message________________________

Table 3 below shows the display of information on the screen that the user sees on the terminal when the data contains incorrect information:

TABLE 3

FIRST INTERACTIVE MESSAGE

ILC Change AFS Password

Select fishkill.ibm.com for ILC. Note: the DEFAULT is fishkill

| | |
|---|---|
| fishkill.ibm.com | _x |
| clt.ibm.com | ___ |
| end.ibm.com | ___ |
| btv.ibm.com | ___ |
| sax.btv.ibm.com | ___ |
| tkl.ibm.com | ___ |

Enter your user-id: EdKelley
Enter your password: ________
Enter your new password: \*\*\*\*\*\*
Re-enter your new password: \*\*\*\*\*\*
Message_Wrong_Password________________

When the data is corrected and resubmitted with other incorrect information, Table 4 below shows the message returned to the screen:

TABLE 4

SECOND INTERACTIVE MESSAGE

ILC Change AFS Password

Select fishkill.ibm.com for ILC. Note: the DEFAULT is fishkill

| | |
|---|---|
| fishkill.ibm.com | _x |
| clt.ibm.com | ___ |
| end.ibm.com | ___ |
| btv.ibm.com | ___ |
| sax.btv.ibm.com | ___ |
| tkl.ibm.com | ___ |

Enter your user-id: EdKelley
Enter your password: \*\*\*\*\*\*
Enter your new password: \*\*\*\*\*\*
Re-enter your new password: \*\*\*\*\*\*
Message_New_Passwords_don't_match.________

Table 5 below shows the display of information on the screen indicating the results of correcting the information, submitting the form and getting the results back to the screen:

TABLE 5

THIRD INTERACTIVE MESSAGE

ILC Change AFS Password

Select fishkill.ibm.com for ILC. Note: the DEFAULT is fishkill

| | |
|---|---|
| fishkill.ibm.com | _x |
| clt.ibm.com | ___ |

TABLE 5-continued

THIRD INTERACTIVE MESSAGE

| | |
|---|---|
| end.ibm.com | ___ |
| btv.ibm.com | ___ |
| sax.btv.ibm.com | ___ |
| tkl.ibm.com | ___ |

Enter your user-id: EdKelley
Enter your password: \*\*\*\*\*\*
Enter your new password: \*\*\*\*\*\*
Re-enter your new password: \*\*\*\*\*\*
Message_Wrong_cell_or_Incorrect_ID________

Table 6 below shows the display of information on the screen which results after correcting the information, resubmitting the form and getting the message that the transaction was successful:

TABLE 6

FINAL INTERACTIVE MESSAGE

ILC Change AFS Password

Select fishkill.ibm.com for ILC. Note: the DEFAULT is fishkill

| | |
|---|---|
| fishkill.ibm.com | _x |
| clt.ibm.com | ___ |
| end.ibm.com | ___ |
| btv.ibm.com | ___ |
| sax.btv.ibm.com | ___ |
| tkl.ibm.com | ___ |

Enter your user-id: EdKelley
Enter your password: \*\*\*\*\*\*
Enter your new password: \*\*\*\*\*\*
Re-enter your new password: \*\*\*\*\*\*
Message_User_id_EdKelley_was_successfully_changed.________

From the user's perspective, there was only one screen (Table 1) that was in use for the entire session and that the screen was simply being refreshed when there was interaction with the web server. In reality, each time the screen changed a new screen was created and stored in the client computer web browser cache, and the screen access path in the client computer web browser was updated.

The present invention provides to the user a "true" interactive view on the web browser by having the web browser provide a screen access path that will not include any unnecessary interactive screens from the screen access path. This is accomplished by removing the unnecessary interactive screens from the web browser cache and the screen access path each time a new interactive screen is built. A gateway program processes the information and passes information back to the web browser as to which files to remove from the web browser cache and which screens to remove from the screen access path. The gateway program also informs the web browser as to which files to store in the interactive web browser cache and which screens to store in the interactive screen access path.

Gateway programs, like files, are referenced using URLs. When a client computer accesses a gateway program, the server activates the program and the common gateway interface (CGI) mechanisms to pass to the program data sent by the client (if any). The gateway program acts on the data and returns its response back to the server, again using the CGI mechanisms. The server then forwards the data back to the client that initiated the request using the HTTP protocol, completing the transaction.

Since the print function is accessed when the screen access path is traversed, the print function would also access the same set of screens, this invention would also allow the user to print the screen from the screen access path. Since the print function is also accessed when traversing the interactive screen access path the invention also allows printing from the interactive screen access path.

Figure 2:
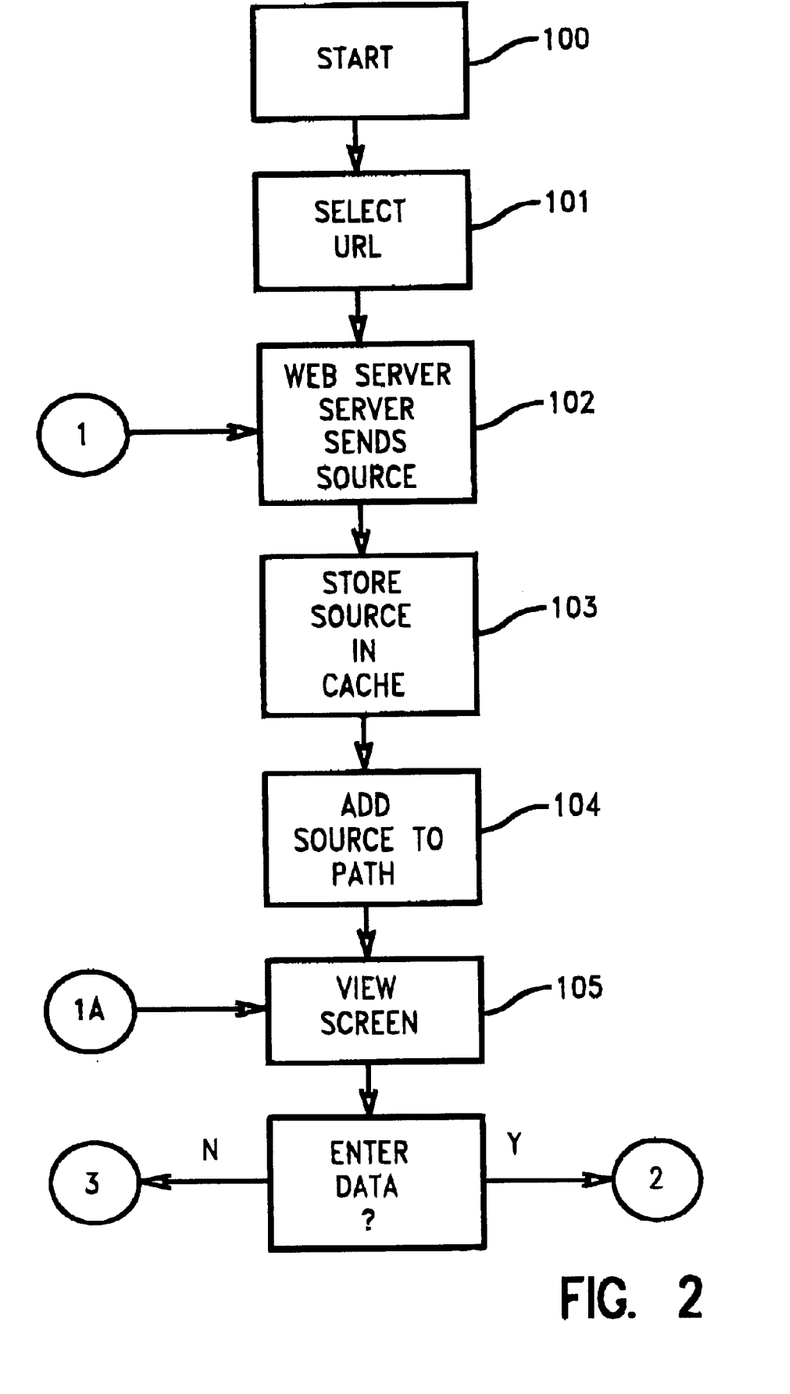
FIGS. 2–4 are block diagram flow charts of the preferred steps employed in practicing the present invention.
Figure 3:
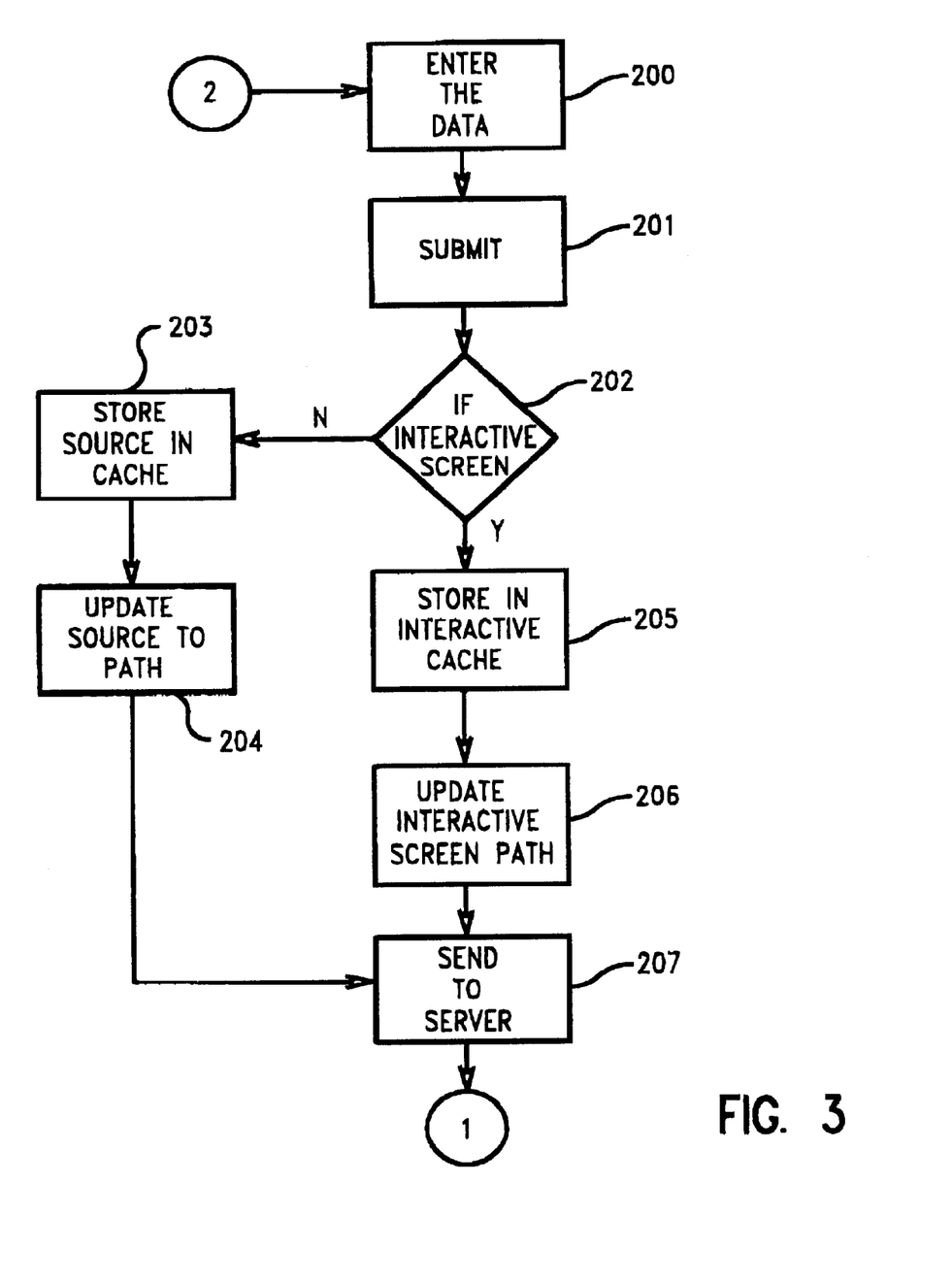
Figure 4:
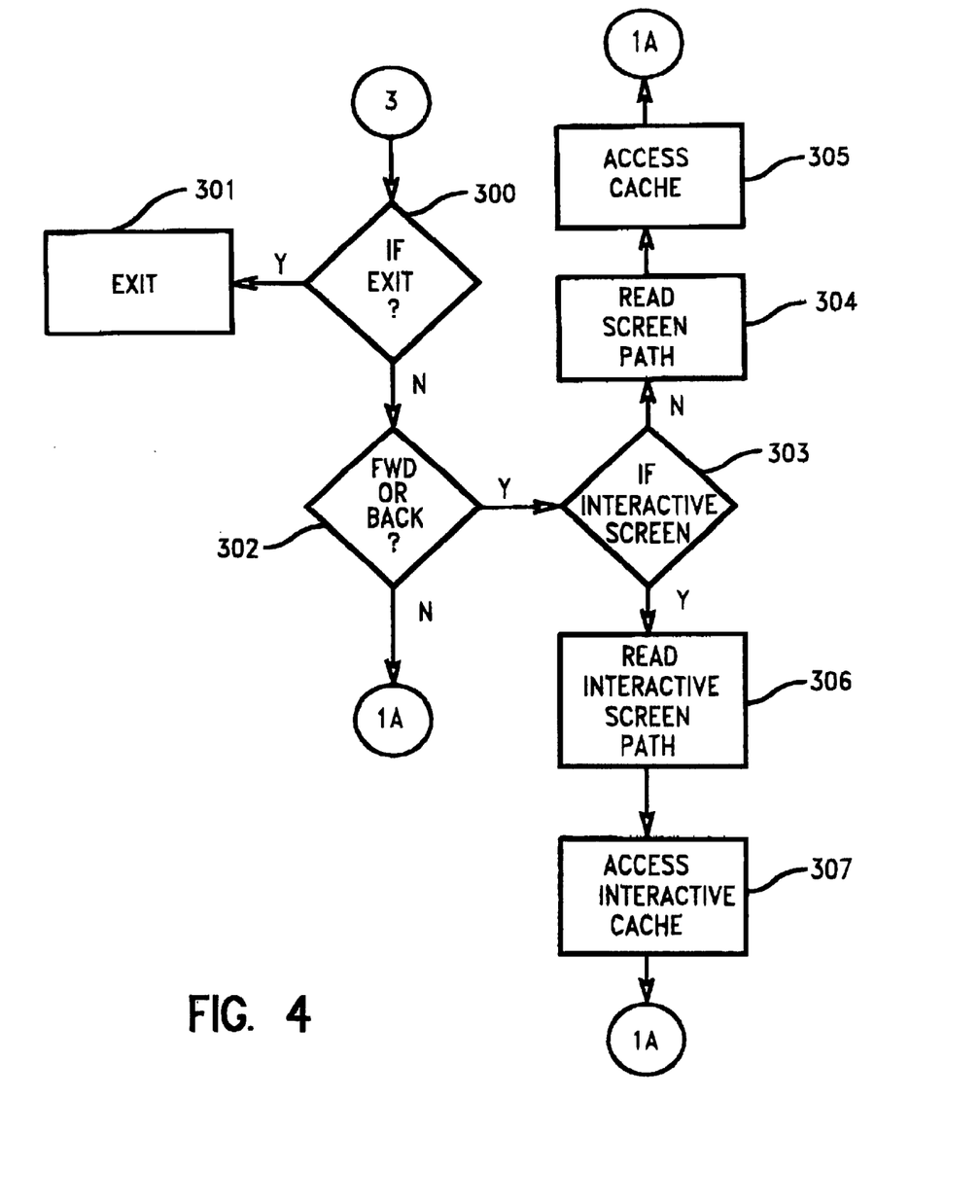

Flow charts of the process used in the present invention is shown in FIGS. 2–4. Numerals in circles indicate connections to like numerals in other parts of the flow charts. These figures describe the operations on the client computer server running the web browser, and the flow chart description is as follows:

- 100—Start the process.
- 101—Select the URL. The URL points to an application that processes information on the web server with a gateway program.
- 102—Web server sends source. The web server sends the HTML source file and the supporting graphics files and programs to the web client.
- 103—Store source in cache. Store the HTML source file in web browser cache together with supporting graphics files and programs.
- 104—Add source to path. Add an indicator that points to the HTML source file to the web browser screen path.
- 105—View the screen. The web browser interprets the HTML source file with the supporting graphics and programs to build the HTML file.
- 106—Enter data. Do you want to enter the information that is required by the form on the screen?
- 200—Enter the Data. Enter the data that is required by the form on the screen.
- 201—Submit. Press the on-screen button that will send the form to the web server.
- 202—If interactive screen?
- 203—Store source in cache. Store the HTML source file in web browser cache together with supporting graphics files and programs.
- 204—Update source to path. Add an indicator that points to the HTML source file to the web browser screen path.
- 205—Store in interactive in cache. Store the HTML source file in interactive web browser cache together with supporting graphics files and programs. Tables 2 to 6 show the interactive screens that would have the HTML source file and supporting graphics and programs stored in the interactive web browser cache.
- 206—Update interactive screen path. Add an indicator that points the HTML source file to the interactive web browser screen path. The HTML source files for Tables 2 to 6 would be indicated in the interactive web browser screen path. When the screen for Table 3 is stored, the screen for Table 2 is removed from path together with the HTML source files therefor. When the screen for Table 4 is stored, the screen for Table 3 would be removed from path together with the HTML source files therefor. When the screen for Table 5 is stored, the screen for Table 4 would be removed from path together with the HTML source files therefor. When the screen for Table 6 is stored, the screen for Table 5 would be removed from path together with the HTML source files therefor. There may be occasions when there would not be a one-for-one replacement of screens. Depending on the screens being presented, the server program that builds the screens may select the screens that would be replaced, erasing redundant screens.
- 207—Send to server. Send the updated form to the web server for processing with a gateway program.
- 300—If exit?
- 301—Exit. Exit the program.
- 302—Fwd or back? Is this a request to traverse forward or backward on the path of the previously selected and viewed screens?
- 303—If interactive screen? Is there a request to traverse an interactive screen?
- 304—Read screen path. Read the screen access path to find the HTML source file to retrieve from the web browser cache. The HTML source file for Table 1 would be indicated in the screen access path.
- 305—Access cache. Access the web browser cache to read the HTML source file and supporting graphics files and programs. The HTML source file for Table 1 together with the supporting graphics files and programs would be stored in the web browser cache.
- 306—Read interactive screen path. Read the interactive screen access path to find the HTML source file to retrieve from the web browser cache. The HTML source files for Tables 2 to 6 would be indicated in the interactive screen access path.
- 307—Access interactive cache. Access the interactive web browser cache to read the HTML source file and supporting graphics files and programs. The HTML source files for Tables 2 or 3 or 4 or 5 or 6, together with the supporting graphics files programs, would be stored in the interactive web browser cache.

As an alternative to the above, instead of saving non-interactive and interactive HTML files in two different caches, the web browser may be constructed so that only non-interactive HTML files are saved in one web browser cache. In this embodiment, all interactive HTML files would be eliminated from the web browser cache, and therefor would not be accessible in the web browser screen access path.

Thus, the present invention provides an improved method and system for controlling and moving along paths of previously accessed interactive inter- or intra-net HTML source files, in which the web browser has the ability in the web browser cache and web browser screen access path to distinguish between interactive screens having blanks and interactive screens having filled-in blanks. The web browser also has the ability to selectively eliminate from the web browser cache interactive screens having filled-in blanks, and the ability to avoid in the web browser screen access path interactive screens having filled-in blanks.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for controlling and moving along a path containing previously accessed interactive inter- or intra-net HTML source files comprising the steps of:

a) providing a web browser having i) a first non-interactive web browser cache for storing data from a plurality of HTML source files and a first non-interactive web browser screen access path for identifying and displaying each of said HTML source files in the first cache, and ii) a second interactive web browser cache for storing data from a plurality of HTML source files and a second interactive web browser screen access path for identifying and displaying each of said HTML source files in the second cache;

b) selecting a desired non-interactive HTML source file;

c) downloading said desired non-interactive HTML source file to said web browser;

d) storing said desired non-interactive HTML source file only in said non-interactive web browser cache and said non-interactive web browser screen access path;

e) selecting a desired interactive HTML source file for a form which presents blank spaces for entry of information at said web browser;

f) downloading said desired interactive HTML source file to said web browser;

g) storing said desired interactive HTML source file for a form which presents blank spaces only in said non-interactive web browser cache and said non-interactive web browser screen access path;

h) filling in said blank spaces on the desired interactive HTML source file form; and i) said web browser selectively eliminating said desired interactive HTML source file form presenting filled-in spaces from said non-interactive web browser cache by storing said desired interactive HTML source file form presenting filled-in spaces only in said interactive web browser cache and said interactive web browser screen access path, thereby said web browser having the ability to distinguish between said interactive HTML source file form presenting blank spaces and said interactive HTML source file form presenting filled-in spaces.

2. The process of claim 1 further including the step of:

j) traversing said non-interactive web browser screen access path and optionally displaying an HTML source file from data in said non-interactive web browser cache.

3. The process of claim 2 wherein in step (j) only said non-interactive HTML files and the interactive HTML source file for a form which presents blank spaces are displayed.

4. The process of claim 1 further including the step of:

j) traversing said non-interactive web browser screen access path and printing a web page from data in said non-interactive web browser cache.

5. The process of claim 1 further including the step of:

j) traversing said interactive web browser screen access path and optionally displaying an HTML source file from data in said interactive web browser cache.

6. The process of claim 5 wherein in step (j) only the interactive HTML files for forms which present filled-in spaces are displayed.

7. The process of claim 5 further including the step of:

k) traversing said interactive web browser screen access path and printing a web page from data in said interactive web browser cache.

8. The process of claim 1 wherein a plurality of interactive HTML source file forms presenting filled-in spaces are stored in said interactive web browser cache and said interactive web browser screen access path, and further including the step of:

j) eliminating from said interactive web browser screen access path an interactive HTML source file form presenting filled-in spaces if the only difference between such interactive HTML source file form presenting filled-in spaces and another interactive HTML source file form presenting filled-in spaces is an informational message.

9. A web browser system for controlling and moving along a path containing previously accessed interactive inter- or intra-net HTML source files comprising:

a first non-interactive web browser cache adapted to store data only from a plurality of non-interactive HTML source files and a plurality of interactive HTML source files for forms which present blank spaces for entry of information at said web browser;

a first non-interactive web browser screen access path for identifying and displaying only each of said non-interactive HTML source files and interactive HTML source files for forms which present blank spaces from data in said first web browser cache;

a second interactive web browser cache for storing data only from a plurality of interactive HTML source files for forms which present filled-in spaces; and a second interactive web browser screen access path for identifying and displaying only each of said interactive HTML source files for forms which present filled-in spaces from data in said second web browser cache wherein said web browser system selectively eliminates said desired interactive HTML source file forms presenting filled-in spaces by storing said desired interactive HTML source file form presenting filled-in spaces only in said interactive web browser cache and said interactive web browser screen access path, thereby said web browser system distinguishing between said interactive HTML source file forms presenting blank spaces and said interactive HTML source file forms presenting filled-in spaces.

10. The system of claim 9 further comprising means for displaying from data in said first web browser cache only said non-interactive HTML source files and interactive HTML source files for forms which present blank spaces and means for displaying from data in said second web browser cache only said interactive HTML source files for forms which present filled-in spaces.

11. The system of claim 10 further comprising means for printing from said first web browser cache only said non-interactive HTML source files and interactive HTML source files for forms which present blank spaces and means for printing from said second web browser cache only said interactive HTML source files for forms which present filled-in spaces.

12. A program storage device readable by a machine, tangibly embodying a web browser having i) a first non-interactive web browser cache for storing data from a plurality of HTML source files and a first non-interactive web browser screen access path for identifying and displaying each of said HTML source files in the first cache, and ii) a second interactive web browser cache for storing data from a plurality of HTML source files and a second interactive web browser screen access path for identifying and displaying each of said HTML source files in the second cache, said web browser further having a program of instructions executable by the machine to perform a method of controlling and moving along a path containing previously accessed interactive inter- or intra-net HTML source files, said method comprising the steps of:

a) downloading a desired non-interactive HTML source file to said web browser;

b) storing said desired non-interactive HTML source file only in said non-interactive web browser cache and said non-interactive web browser screen access path;

c) downloading to said web browser a desired interactive HTML source file for a form which presents blank spaces for entry of information at said web browser;

d) storing said desired interactive HTML source file for a form which presents blank spaces only in said non-interactive web browser cache and said non-interactive web browser screen access path;

e) filling in said blank spaces on the desired interactive HTML source file form; and f) said web browser selectively eliminating said desired interactive HTML source file form presenting filled-in spaces from said non-interactive web browser cache by storing said desired interactive HTML source file for a form which presents filled-in spaces only in said interactive web browser cache and said interactive web browser screen access path, thereby said web browser having the ability to distinguish between said interactive HTML source file form presenting blank spaces and said interactive HTML source file form presenting filled-in spaces.

13. A process for controlling and moving along a path containing previously accessed interactive inter- or intra-net HTML source files comprising the steps of:

a) providing a web browser having a web browser cache for storing data from a plurality of HTML source files and a web browser screen access path for identifying and displaying each of said HTML source files, said web browser being present on a client computer which has access to HTML source files on a network computer;

b) downloading a desired HTML source file from said network computer to said web browser on said client computer;

c) determining if the desired HTML file is an interactive or non-interactive HTML file;

d) storing said desired HTML file in said web browser cache and said web browser screen access path only if said HTML file is a non-interactive HTML file or if said HTML file is an interactive HTML file for a form which presents blank spaces for entry of information at said web browser; and e) traversing said web browser screen access path and optionally displaying an HTML source file from data in said web browser cache such that only non-interactive HTML files and interactive HTML files for forms which present blank spaces are traversed and, optionally, displayed, wherein said web browser selectively eliminates an interactive HTML source file for a form which presents filled-in spaces by only storing said interactive HTML file forms presenting blank spaces in said web browser cache and said web browser screen access path.

14. The process of claim 13 wherein in step (e) said non-interactive HTML files are displayed.

15. The process of claim 13 wherein in step (e) said interactive HTML files for forms which present blank spaces are displayed.

16. The process of claim 13 further including the step of:

f) traversing said web browser screen access path and printing a web page from data in said web browser cache.

17. The process of claim 13 wherein a plurality of interactive HTML source files for forms which present filled-in spaces are stored in said interactive web browser cache and said interactive web browser screen access path, and further including the step of:

f) eliminating from said interactive web browser screen access path an interactive HTML source file for a form which presents filled-in spaces if the only difference between such interactive HTML source file form which presents filled-in spaces and another interactive HTML source file for a form which presents filled-in spaces is an informational message.

18. A web browser system for controlling and moving along a path containing previously accessed interactive inter- or intra-net HTML source files comprising:

a web browser cache adapted to store data from a plurality of non-interactive HTML source files and a plurality of interactive HTML source files for forms which present blank spaces for entry of information at said web browser, said web browser further adapted to eliminate from said web browser cache interactive HTML source files for forms which present filled-in spaces; and a web browser screen access path for identifying and displaying only said non-interactive HTML source files and interactive HTML source files for forms which present blank spaces from data in said web browser cache, wherein said web browser system is adapted to selectively eliminate from said web browser cache and said web browser screen access path interactive HTML source file forms presenting filled-in spaces by storing said desired interactive HTML source file form presenting filled-in spaces only in an interactive web browser cache of said web browser system and an interactive web browser screen access path of said web browser system.

19. The system of claim 18 further comprising means for displaying from data in said web browser cache only said non-interactive HTML source files and interactive HTML source files for forms which present blank spaces.

20. The system of claim 19 further comprising means for printing from said web browser cache only said non-interactive HTML source files and interactive HTML source files for forms which present blank spaces.

21. A program storage device readable by a machine, tangibly embodying a web browser having i) a web browser cache adapted to store data from a plurality of non-interactive HTML source files and a plurality of interactive HTML source files for forms which present blank spaces for entry of information at said web browser, said web browser further adapted to eliminate from said web browser cache interactive HTML source files for forms which present filled-in spaces; and ii) a web browser screen access path for identifying and displaying only said non-interactive HTML source files and interactive HTML source files for forms which present blank spaces from data in said web browser cache, said web browser further having a program of instructions executable by the machine to perform a method of controlling and moving along a path containing previously accessed interactive inter- or intra-net HTML source files, said method comprising the steps of:

a) downloading a desired non-interactive HTML source file to said web browser;

b) storing said desired non-interactive HTML source file in said web browser cache and said web browser screen access path;

c) downloading to said web browser a desired interactive HTML source file for a form which presents blank spaces for entry of information at said web browser;

d) storing said desired interactive HTML source file for a form which presents blank spaces in said web browser cache and said web browser screen access path;
e) filling in said blank spaces on said desired interactive HTML source file form; and
f) said web browser selectively eliminating said desired interactive HTML source file for a form which presents filled-in spaces from said web browser cache and said web browser screen access path by only storing in said interactive web browser cache and said interactive web browser screen access path said desired interactive HTML source file form presenting blank spaces.

* * * * *

UNITED STATES PATENT AND TRADEMARK OFFICE
CERTIFICATE OF CORRECTION

PATENT NO. : 6,327,598 B1
DATED : December 4, 2001
INVENTOR(S) : Kelley et al.

It is certified that error appears in the above-identified patent and that said Letters Patent is hereby corrected as shown below:

Column 5,
Line 40, delete "screen" and substitute therefor -- screens --.
Line 61, delete "to".

Column 6,
Line 2, delete "do" and substitute therefor -- go --.
Line 15, delete "indicated" and substitute therefor -- indicates --.
Line 43, Table 1, delete "tkl.ibm.cotn" and substitute therefor -- tkl.ibm.com --.

Signed and Sealed this

Seventh Day of May, 2002

Attest:

JAMES E. ROGAN
Attesting Officer        Director of the United States Patent and Trademark Office